(12) United States Patent
Mann et al.

(10) Patent No.: US 7,530,589 B1
(45) Date of Patent: May 12, 2009

(54) FIFTH WHEEL ASSEMBLY WITH REMOVABLE BEARING PLATE

(75) Inventors: Steven William Mann, Gardendale, AL (US); Jeff Marcus Terry, Birmingham, AL (US); James Matthew Rhodes, Pelham, AL (US); Christopher Aaron Bond, Pinson, AL (US)

(73) Assignee: Fontaine International, Irondale, AL (US)

( * ) Notice: Subject to any disclaimer, the term of this patent is extended or adjusted under 35 U.S.C. 154(b) by 286 days.

(21) Appl. No.: 11/482,366

(22) Filed: Jul. 7, 2006

(51) Int. Cl.
*B62D 53/08* (2006.01)
(52) U.S. Cl. ...................... 280/433; 384/421
(58) Field of Classification Search ........... 280/433, 280/438.1, 423.1, 901; 384/421
See application file for complete search history.

(56) References Cited

U.S. PATENT DOCUMENTS

| | | | |
|---|---|---|---|
| 3,924,909 A * | 12/1975 | Kent et al. ............ | 384/421 |
| 4,542,912 A * | 9/1985 | St. Louis ............. | 280/433 |
| 4,721,323 A | 1/1988 | Czuk et al. | |
| 5,165,713 A * | 11/1992 | Picard ............... | 280/433 |
| 5,449,191 A | 9/1995 | Cattan | |
| 5,707,070 A | 1/1998 | Lindenman et al. | |
| 6,010,141 A * | 1/2000 | Huntimer et al. ....... | 280/433 |
| 6,371,504 B1 * | 4/2002 | Alguera Gallego et al. | 280/433 |
| 2006/0170191 A1 * | 8/2006 | Hungerink et al. ...... | 280/433 |

* cited by examiner

*Primary Examiner*—Anne Marie Boehler
(74) *Attorney, Agent, or Firm*—George P. Kobler; Lanier Ford Shaver & Payne P.C.

(57) ABSTRACT

A fifth wheel with a removable bearing plate includes a load structure comprising frame walls and inner bracing, and including a plurality of flanges, each of said plurality of flanges having an aperture disposed therethrough, said load structure also having at least two pivot bearings; and a bearing plate having a plurality of fasteners extending from an underside of said bearing plate disposed at locations corresponding to the disposition of said apertures configured to permit removable attachment of said bearing plate to said load structure and plurality of ridges disposed upon the underside to form a seat for said frame walls.

8 Claims, 5 Drawing Sheets

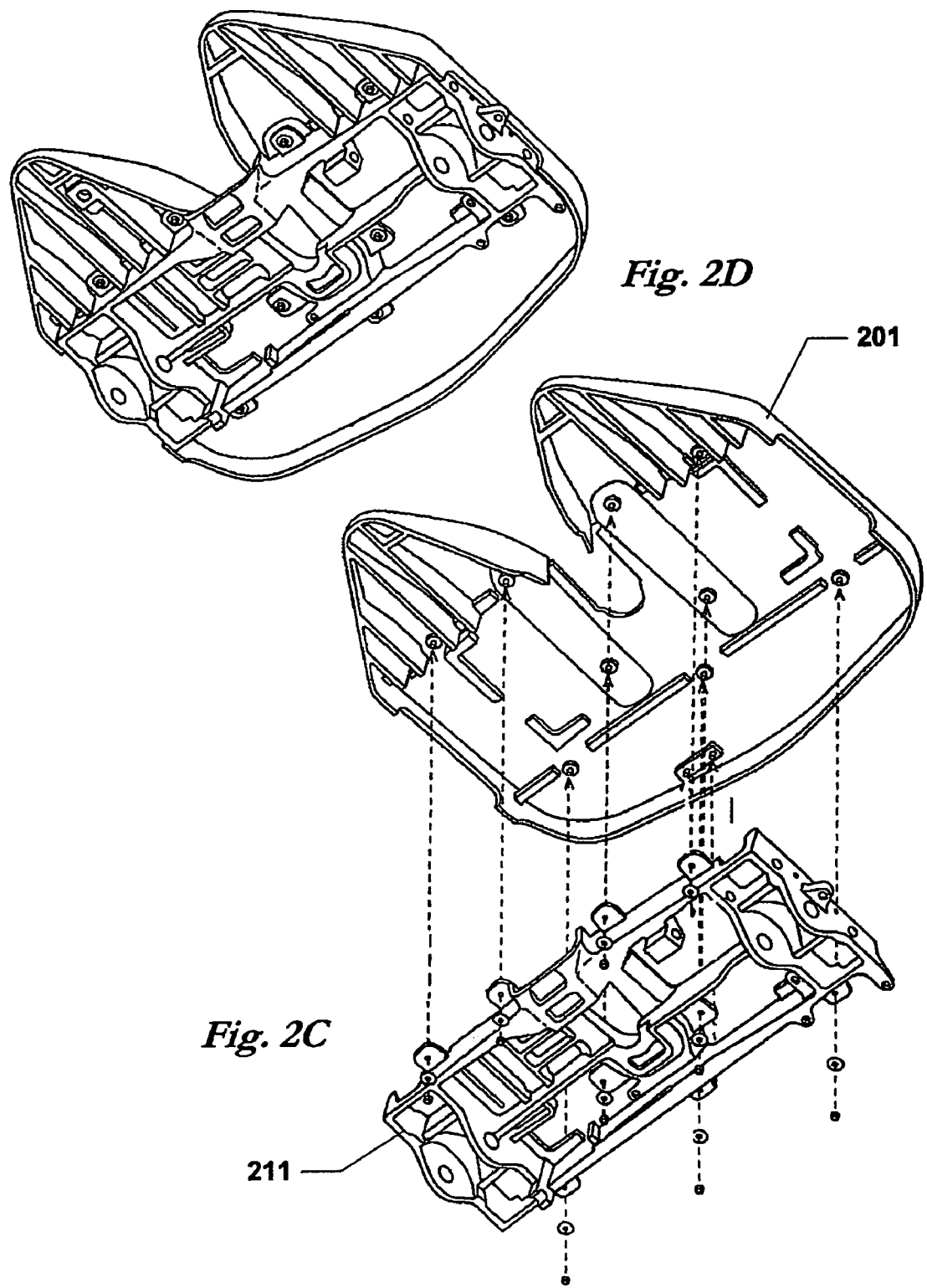

FIFTH WHEEL ASSEMBLY WITH REMOVABLE BEARING PLATE

BACKGROUND

1. Field

The present invention relates generally to fifth wheel assemblies, and in particular, to fifth wheel assemblies with removable bearing plates.

2. Description of the Related Art

Fifth wheel hitches for towing a trailer behind a towing vehicle have long been known in the art. Examples of fifth wheel hitches include those disclosed in U.S. Pat. Nos. 4,721,323, 5,449,191, and 5,707,070.

With reference to prior art FIGS. 1A-1E, large over-the-road freight trailers 119 are usually coupled to tractor trucks 109 by means of a fifth wheel coupling 101 whereby the truck rear drive axles directly support a portion of the trailer 119 load burden. Usually, the fifth wheel coupling 101 and support point is located along the length of the tractor 109 between the rear drive wheels and the front steering wheels thereby distributing the front trailer 119 load. It is desirable for the fifth wheel coupling 101 to be adjustable in the longitudinal position with respect to the truck 109 to aid in control over distribution of the load.

Typically, a fifth wheel coupling 101 includes a support frame 121 for mounting the coupling 101 to the towing vehicle 109, such as, for example, to a tractor truck. This support frame 121 includes a pair of base rails 102 that are usually bolted to the bed and/or frame of the truck and that are tied in parallel by tie bars 104. Side brackets 155 are mounted to the base rails, either directly or through a pedestal 117 which may be longitudinally adjustable. A fifth wheel 130 (FIG. 1C) is mounted to the side brackets 155 by means of a trunnion arrangement (not shown) allowing for pivotal fore-and-aft movement. The fifth wheel 130 comprises a top bearing surface 145, or plate, and a slot 135 opening toward the aft end of the towing vehicle for receiving a trailer kingpin, the slot bounded laterally by a pair of ramped tips 132a, b. Fifth wheel 130 is an assembly which includes a jaw assembly, or locking mechanism (not shown) that is specifically adapted to releasably engage and hold a kingpin 115 of a trailer desired to be towed by the towing vehicle 119.

Prior art fifth wheels are typically formed of steel or ductile iron. FIG. 1E depicts the underside of a typical prior art fifth wheel 130 which incorporates an integral load structure comprising a set of walls 126a-d that serve to transfer the loads experienced by the bearing plate to the support and then to the tractor, and to house the kingpin locking mechanism. The load structure further comprises pivot bearings 127a,b which rest upon the side brackets 155 and permit pivotal movement of the bearing plate 130 in the vertical plane. Heretofore, fifth wheels have been manufactured such that the bearing plate and load structure are integrated, either through casting to produce a unitary fifth wheel, or by welding the two components together.

If, however, a fifth wheel bearing plate is damaged or worn beyond acceptable limits, the entire fifth wheel must be replaced whether or not the load structure underneath is still operable. Also, these methods of manufacture require that the two components be of the same or similar materials. Since the load structure is most often steel, then the bearing plate must also be steel. This means that the fifth wheel is a weighty device.

SUMMARY

The present disclosure is directed to a fifth wheel assembly with a bearing plate that is detachable from the load structure. The load structure generally comprises frame walls and inner bracing, and includes a plurality of flanges, each which includes an aperture disposed therethrough. The load structure also has at least two pivot bearings, similar to the pivot bearings of the prior art.

The detachable bearing plate having a plurality of fasteners extending from its underside that are disposed at locations corresponding to the disposition of the apertures of the load structure configured to permit removable attachment of the bearing plate to the load structure. The underside of the bearing plate also includes a plurality of ridges disposed upon the underside to form a seat for load structure frame walls.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 2C is an exploding perspective view of the assembly according to an embodiment of the present invention; and FIG. 2D is a perspective view of the underside of the assembly according to an embodiment of the present invention.

DETAILED DESCRIPTION

The various embodiments of the present invention and their advantages are best understood by referring to FIGS. 1 through 4 of the drawings. The elements of the drawings are not necessarily to scale, emphasis instead being placed upon clearly illustrating the principles of the invention. Throughout the drawings, like numerals are used for like and corresponding parts of the various drawings.

The drawings represent and illustrate examples of the various embodiments of the invention, and not a limitation thereof. It will be apparent to those skilled in the art that various modifications and variations can be made in the present inventions without departing from the scope and spirit of the invention as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present invention covers such modifications as come within the scope of the features and their equivalents.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

This invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Figure 1A:
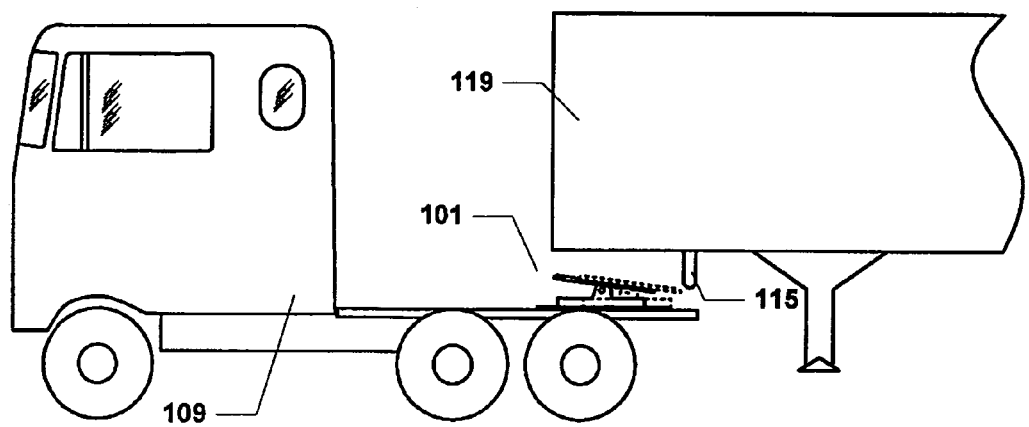
FIG. 1A is an illustration of an exemplary tractor and trailer showing the placement of a typical fifth wheel coupling.
Figure 1B:
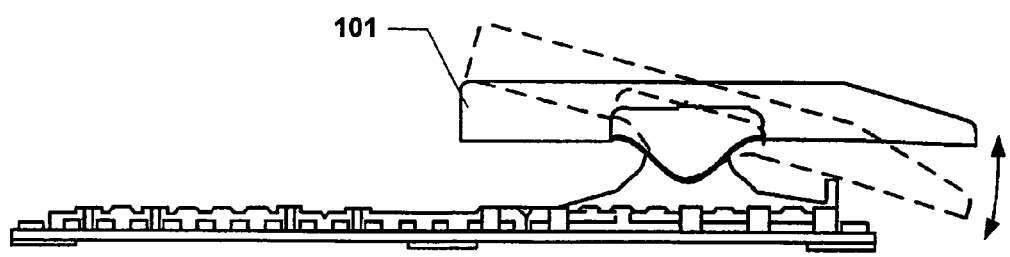
FIG. 1B is a side view of an exemplary fifth wheel coupling.
Figure 1C:
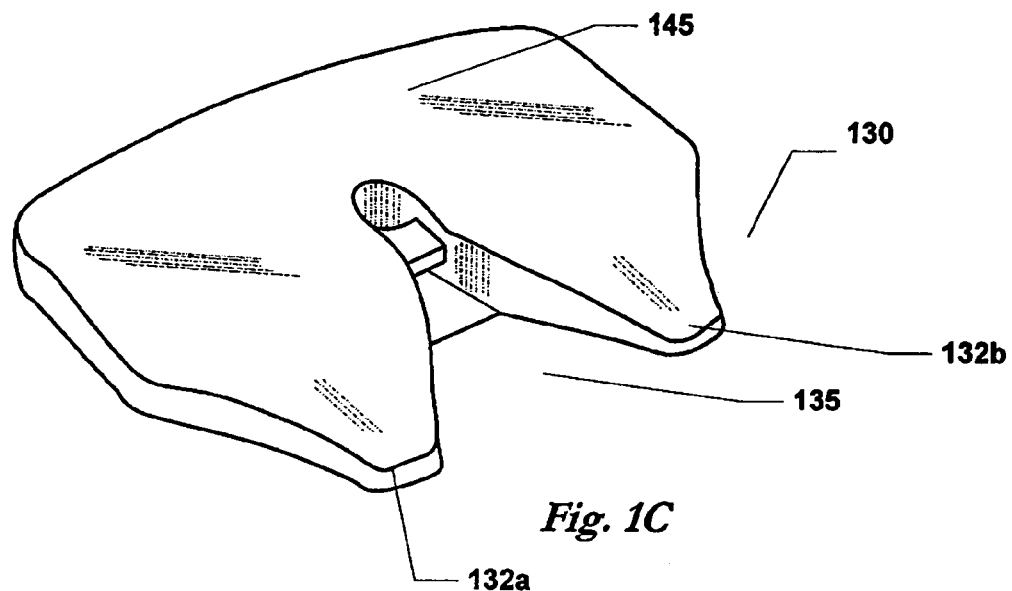
FIG. 1C depicts an exemplary fifth wheel bearing plate.
Figure 1D:
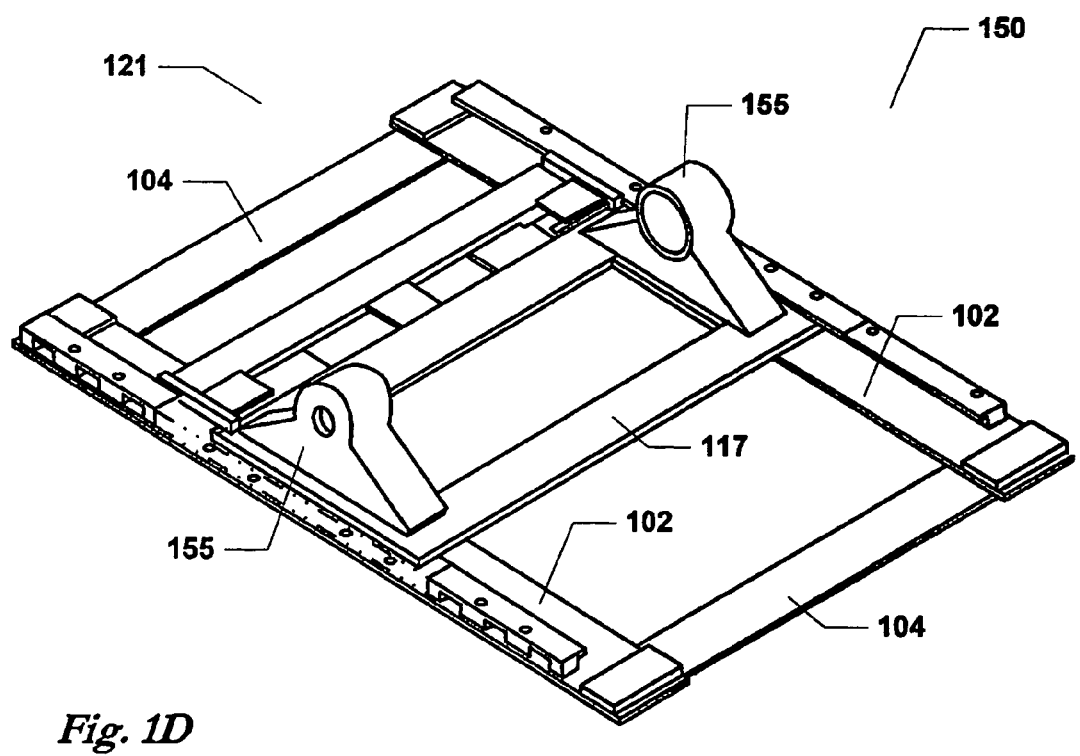
FIG. 1D illustrates an exemplary fifth wheel mounting assembly.
Figure 1E:
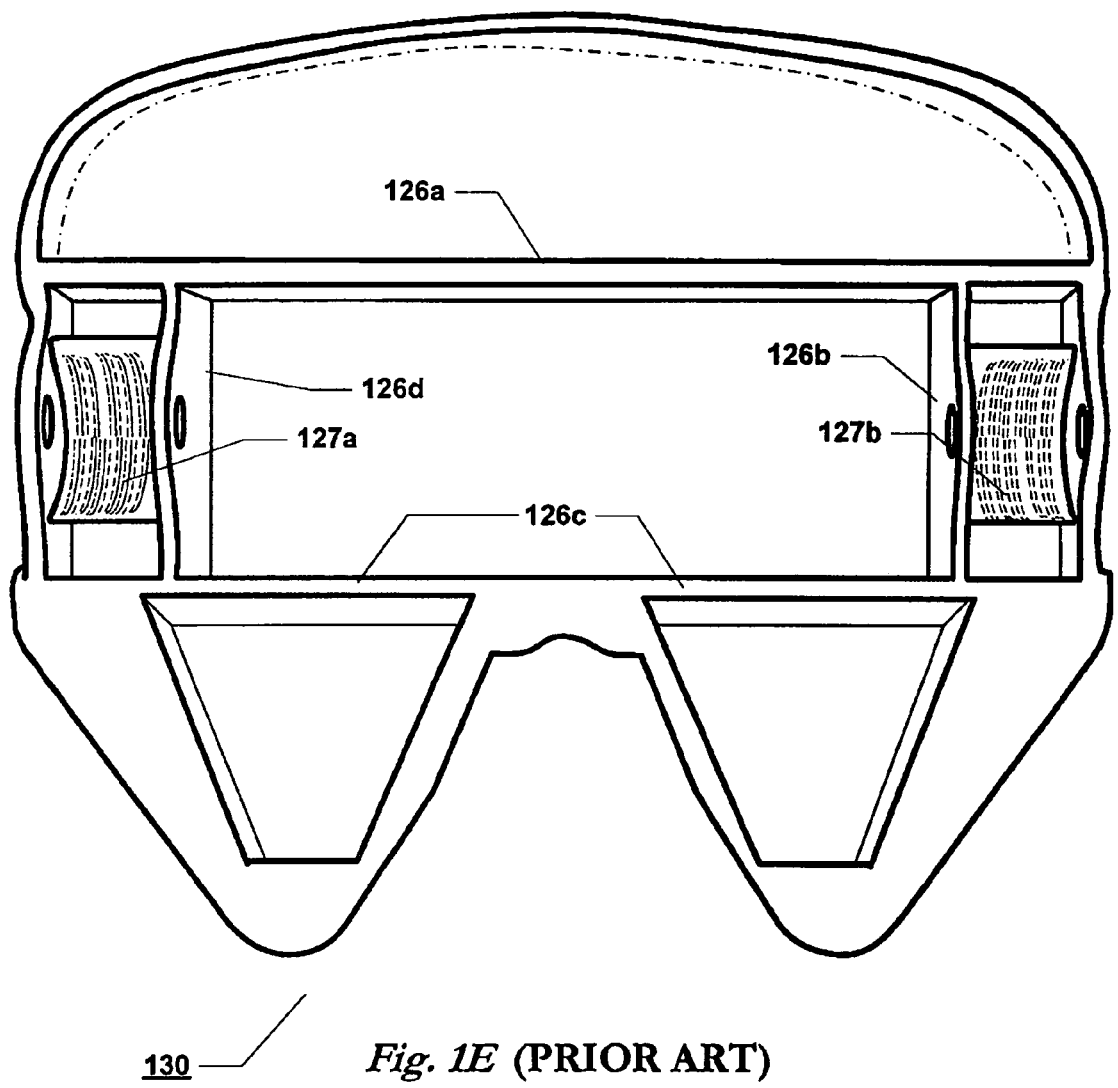
FIG. 1E shows the underside of an exemplary fifth wheel bearing plate of the prior art.
Figure 2A:
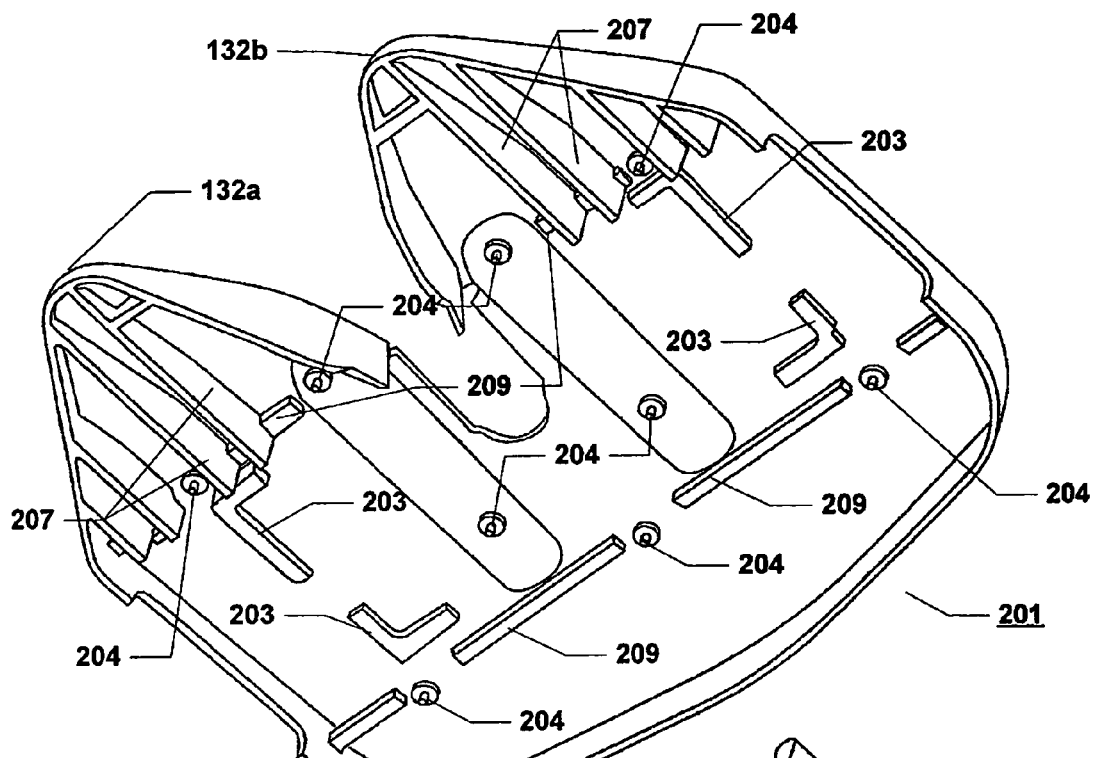
FIG. 2A is perspective view of the underside of a removable beating plate according to an embodiment of the present invention.
Figure 2B:
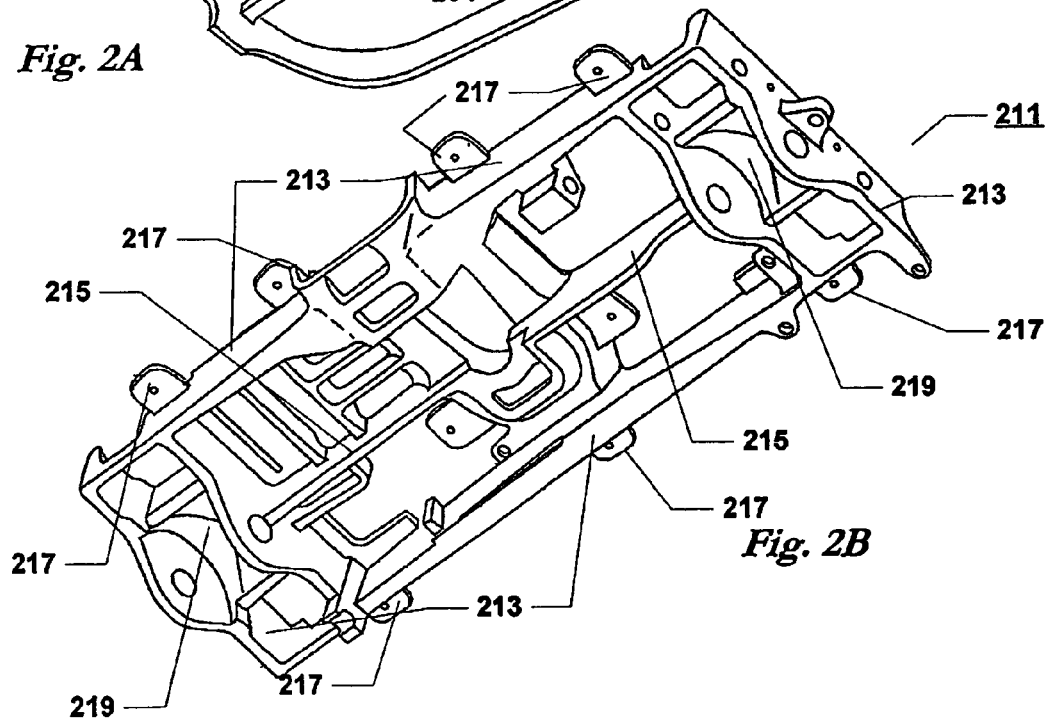
FIG. 2B is a perspective view of a load structure according to an embodiment of the present invention.

As used herein, terms of orientation such as "front," "rear," "lateral", "vertical" or "horizontal" or the like are to be construed with respect to a truck upon which the fifth wheel coupling is mounted. FIGS. 2A and 2B depict the underside of an exemplary bearing plate 201 and an exemplary load structure, respectively, according to an embodiment of the present invention. First, load structure 211 comprises outer walls 213 configured so as to form a frame and bracing structures 215 extending from the inner portions of the frame walls 213 and spanning the interior of the load structure 211. The inner bracing structure 215 may also provide mounting support for a kingpin locking mechanism. As such, the placement, shape and thickness of inner wall bracing structures 215 will depend upon fitting the locking mechanism therein. Load structure further incorporates pivot bearings 219. Outer walls 213 forming the frame of the load structure are oriented such that the frame is generally perpendicular with respect to the underside of the bearing plate 201. Extending from any of outer walls 213 or inner bracing structure at different points are flanges that support apertures 217.

The bearing plate 201 underside includes a plurality of fasteners 204 extending from the surface of the underside set in locations corresponding to the locations of the apertures 217 of load structure 211 that are dimensioned to receive fasteners. Fasteners 204 may advantageously be affixed within the material constituting the plate with the head of each fastener 204 surrounded by a boss, formed in the casting process of the plate 201, and adapting flanges of the load structure to include a recess surrounding the aperture where the recess is dimensioned to receive a boss therein. It will be appreciated that using the boss distributes any lateral forces that may act upon the fasteners, thus preventing shearing or torsion thereof.

Two sets of ridges, an inner set 203, and an outer set 209 protrude from the underside of the bearing plate. The inner set 203 of ridges is disposed in a configuration such that the outer dimensions of the configuration fit within the Outer walls 213 of load structure 211. Outer set 209 of ridges are disposed parallel to the fore and aft ridges of the inner set 203 and spaced apart therefrom such that outer walls of load structure may be seated snugly therebetween. Bearing plate 201 may also include a series of ribs 207 that also protrude from the underside of the plate 201 and extend from the tips 132a, b of the plate to the inner edge of the aftward outer ridges 209 parallel to the longitudinal axis of the bearing plate 201.

FIGS. 2C & D simply illustrate the assembly of the fifth wheel, mating load structure 211 to underside of bearing plate 201 using any suitable fasteners inserted in load structure apertures and fastened appropriately (e.g., with nuts, or the like) creating attachment points. Once assembled, the attachment points, along with the ridges 203, 209 and the ribs 207 of the bearing plate 201 serve to transfer both imposed and shear loads acting upon the bearing plate 201 to the load structure 211. It will be appreciated by those skilled in the art that ridges, and ribs may be disposed on the underside of bearing plate in any configuration that achieves transference of such loads to the load structure, and therefore, the invention should not be considered limited to the configurations described above.

A fifth wheel according to the present invention results in several advantages over fifth wheels of the prior art as would be appreciated by those skilled in the art with the benefit of this disclosure. First, if the bearing plate is damaged, only the bearing plate needs to be replaced, and the material comprising the load structure may still be used resulting in more efficient use of materials. Second, because the two components may be of different materials, while the load structure may preferably be formed from steel, etc., the bearing plate may be formed from a material that is strong enough to withstand the anticipated loads, but that requires no, or little lubrication, such as High Density Polyethylene (HDPE), or like plastics, or composite materials. A fifth wheel thus constructed would also have the advantage of lighter weight compared to prior art all-steel fifth wheels. Further, different load structures matched with different bearing plates to accommodate a variety of load applications in different environments.

As described above and shown in the associated drawings, the present invention comprises a fifth wheel assembly with removable bearing plate. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. A fifth wheel assembly comprising:
   a. a load structure comprising frame walls and inner bracing, and including a plurality of flanges, each of said plurality of flanges having an aperture disposed therethrough, said load structure also having at least two pivot bearings; and
   b. a bearing plate having a plurality of fasteners extending from an underside of said bearing plate disposed at locations corresponding to the disposition of said apertures configured to permit removable attachment of said bearing plate to said load structure and plurality of ridges disposed upon the underside to form a seat for said frame walls, and a plurality of ribs extending longitudinally along the underside of said bearing plate from a rearward side of said bearing plate to cross the outermost of said ridges, said ribs conforming to the outer wall of said load structure when attached thereto.

2. The fifth wheel of claim 1, wherein said bearing plate is made from one of a plastic material, aluminum, and a composite material.

3. The fifth wheel of claim 1, wherein each of said plurality of fasteners is affixed to the underside of said bearing plate such that each fastener head is surrounded by a boss, and wherein each of said flanges include a recess surrounding said aperture that is dimensioned to receive said boss.

4. The fifth wheel of claim 3, wherein said bearing plate is made from one of a plastic material, aluminum, and a composite material.

5. A replaceable bearing plate for a fifth wheel assembly, comprising:
   a. a plurality of fasteners extending from an underside of said bearing plate configured to permit removable attachment of said bearing plate to a load structure, said load structure having a plurality of apertures for receiving each of said plurality of fasteners;
   b. a plurality of ridges disposed upon the underside to form a seat for the load structure; and
   c. a plurality of ribs extending longitudinally along the underside of said bearing plate from a rearward side of said bearing plate to cross the outermost of said ridges, said ribs conforming to an outer wall of said load structure when attached thereto.

6. The replaceable bearing plate of claim 5, wherein said bearing plate is made from one of a plastic material, aluminum, and a composite material.

7. The replaceable bearing plate of claim 5, wherein each of said plurality of fasteners is affixed to the underside of said bearing plate such that each fastener head is surrounded by a boss.

8. The replaceable bearing plate of claim 7, wherein said bearing plate is made from one of a plastic material, aluminum, and a composite material.

\* \* \* \* \*